United States Patent
Tomlinson et al.

(10) Patent No.: US 8,318,102 B2
(45) Date of Patent: Nov. 27, 2012

(54) PROCESS FOR INCREASING THE EFFICIENCY OF HEAT REMOVAL FROM A FISCHER-TROPSCH SLURRY REACTOR

(75) Inventors: H. Lynn Tomlinson, Tulsa, OK (US); William Manning, Osawatomie, KS (US); William Schaefer, Overland Park, KS (US); Tsungani Record, Tulsa, OK (US)

(73) Assignee: Syntroleum Corporation, Tulsa, OK (US)

( * ) Notice: Subject to any disclaimer, the term of this patent is extended or adjusted under 35 U.S.C. 154(b) by 800 days.

(21) Appl. No.: 12/334,754

(22) Filed: Dec. 15, 2008

(65) Prior Publication Data

US 2010/0150293 A1  Jun. 17, 2010

(51) Int. Cl.
*F27B 15/14* (2006.01)
(52) U.S. Cl. ........ 422/146; 422/129; 422/139; 376/207; 376/210
(58) Field of Classification Search .................. 376/207, 376/210, 347, 352, 361, 366, 370, 373; 422/129, 422/139, 146

See application file for complete search history.

(56) References Cited

U.S. PATENT DOCUMENTS

| | | | |
|---|---|---|---|
| 2,475,025 A | | 2/1949 | Huff |
| 2,500,519 A | * | 3/1950 | Clark ............................ 518/712 |
| 2,759,878 A | | 8/1956 | Berg |
| 2,852,545 A | | 9/1958 | Jenny |
| 3,094,479 A | | 6/1963 | Maxwell |
| 3,434,807 A | | 3/1969 | Ibing et al. |
| 5,100,609 A | * | 3/1992 | Oosterkamp ................. 376/210 |
| 5,303,275 A | * | 4/1994 | Kobsa ............................ 376/352 |
| 6,523,502 B1 | * | 2/2003 | Hughes .......................... 122/379 |
| 6,619,383 B2 | | 9/2003 | Squires |
| 7,096,931 B2 | | 8/2006 | Chang et al. |
| 7,108,835 B2 | * | 9/2006 | Hawthorne et al. ........... 422/146 |
| 2002/0011328 A1 | | 1/2002 | Squires |
| 2003/0079867 A1 | | 5/2003 | Chang et al. |
| 2004/0069454 A1 | | 4/2004 | Bonsignore et al. |
| 2004/0251001 A1 | | 12/2004 | Maude |
| 2006/0076127 A1 | | 4/2006 | Bowe et al. |
| 2007/0283907 A1 | * | 12/2007 | Brinkmann et al. .......... 122/460 |

* cited by examiner

*Primary Examiner* — Ricardo Palabrica
*Assistant Examiner* — Marshall O'Connor
(74) *Attorney, Agent, or Firm* — Hall Estill Law Firm

(57) ABSTRACT

The present invention is directed to a cooling system for removing heat from a Fischer-Tropsch (F-T) slurry reactor. The cooling system including at least one downcomer having an upper portion, a lower portion, and a diameter; the at least one downcomer disposed within the F-T reactor to deliver a coolant downward through the F-T reactor at a predetermined velocity, the at least one downcomer extending a length within the F-T reactor wherein the coolant is introduced into the upper portion of the at least one downcomer in a substantially liquid phase; the diameter of the at least one downcomer and the pressure of the introduced coolant cooperate to increase the coolant velocity thereby generating backpressure in the at least one downcomer to maintain the coolant in the substantially liquid phase along the length of the at least one downcomer. The cooling system further including a plenum connected to the lower portion of the at least one downcomer; the plenum in fluid communication with the at least one downcomer wherein the coolant remains in the substantially liquid phase. Additionally, the cooling system includes at least one riser having a length and extending upward from the plenum; the at least one riser in fluid communication with the plenum wherein a portion of the coolant vaporizes to provide a boiling heat transfer surface on the at least one riser.

5 Claims, 3 Drawing Sheets

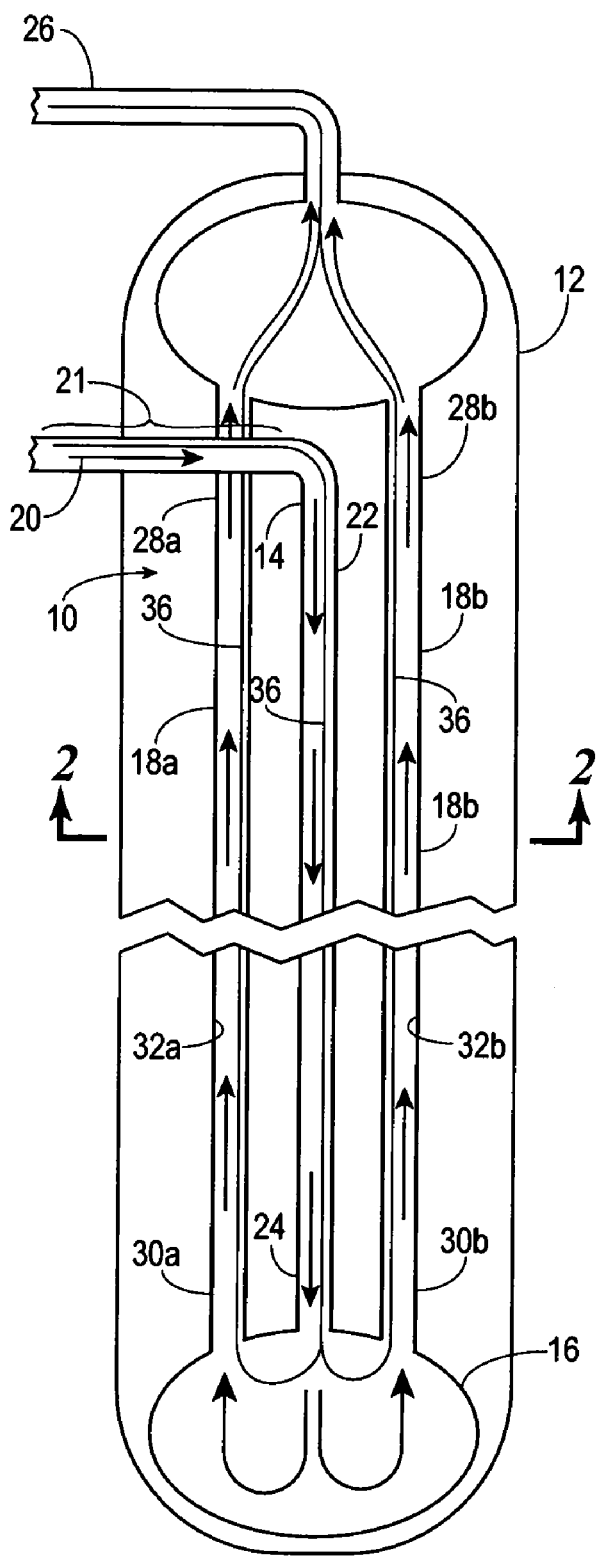
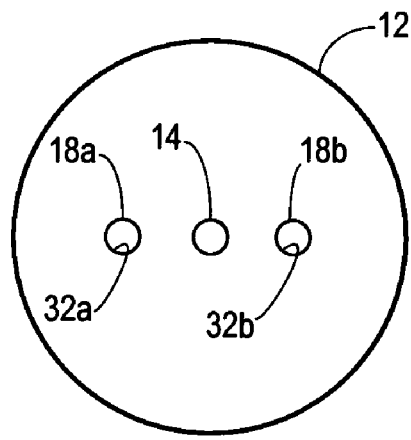
*Fig. 1*
*Fig. 2*

PROCESS FOR INCREASING THE EFFICIENCY OF HEAT REMOVAL FROM A FISCHER-TROPSCH SLURRY REACTOR

STATEMENT REGARDNING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

1. Field of the Invention

The present invention relates to a process for removing heat from a Fischer-Tropsch (F-T) slurry reactor and a system implemented by the process for removing heat from a (F-T) slurry reactor.

2. Description of the Related Art

The F-T reaction is an exothermic reaction requiring the need for heat removal to maintain the internal reactor temperature at the desired operating temperature. Heat Removal/Temperature control in a F-T reactor is very important for maintaining catalyst performance. Heat removal from a slurry F-T reactor is typically accomplished by an internal or external heat transfer system. The heat transfer system typically consists of heat transfer tubes with a cooling medium (i.e. water) circulating internally. Heat is transferred from the slurry to the cooling medium. In the case of water as a cooling medium, steam is generated.

The required heat removal adds significant capital to the cost of the reactor in the form of additional metal. There are many design approaches that can be applied to address the heat removal requirement from the F-T Reactor. In one design, split-zones (with a zone being a cylinder with cross section equal to the reactor internal diameter and of a certain height, see FIG. 1 for illustration) may be used to promote efficient heat removal. In another design a steam drum may be elevated above the heat transfer tubes to eliminate vaporization in the downcomer and promote efficient heat transfer in the risers. In either approach, forced or natural circulation could be considered.

To this end, although various reactor designs may be utilized to remove heat, further improvements are desirable to remove the need for multiple zones and elevated drums. It is to such a reactor design that the present invention is directed.

SUMMARY OF THE INVENTION

The present invention relates to a cooling system for removing heat from a Fischer-Tropsch (F-T) slurry reactor. The cooling system includes at least one downcomer having an upper portion, a lower portion, and a diameter; the at least one downcomer disposed within the F-T reactor to deliver a coolant downward through the F-T reactor at a predetermined velocity, the at least one downcomer extending a length within the F-T reactor wherein the coolant is introduced into the upper portion of the at least one downcomer in a substantially liquid phase; the diameter of the at least one downcomer and the pressure of the introduced coolant cooperate to increase the coolant velocity thereby generating backpressure in the at least one downcomer to maintain the coolant in the substantially liquid phase along the length of the at least one downcomer. The cooling system also including a plenum connected to the lower portion of the at least one downcomer; the plenum in fluid communication with the at least one downcomer wherein the coolant remains in the substantially liquid phase. Additionally, the cooling system includes at least one riser having a length and extending upward from the plenum; the at least one riser in fluid communication with the plenum wherein a portion of the coolant vaporizes to provide a boiling heat transfer surface on the at least one riser.

In another embodiment, the present invention is directed toward a cooling system for removing heat from a Fischer-Tropsch (F-T) slurry reactor. The cooling system includes at least one downcomer having an upper portion and a lower portion; the at least one downcomer disposed within the F-T reactor to deliver a coolant downward through the F-T reactor, the at least one downcomer extending a length within the F-T reactor wherein the coolant is introduced into the upper portion of the at least one downcomer in a substantially liquid phase. The cooling system also includes a plenum connected to the lower portion of the at least one downcomer; the plenum in fluid communication with the at least one downcomer wherein the coolant remains in the substantially liquid phase. The cooling system is further provided with at least one riser having a length and extending upward from the plenum; the at least one riser in fluid communication with the plenum wherein a portion of the coolant vaporizes as the coolant travels along the length of the at least one riser, the at least one downcomer, the plenum, and the at least one riser defining a flow path by which the coolant travels through the F-T reactor. Additionally, the cooling system includes a restrictor having a first side and a second side, the restrictor positioned in a predetermined portion of the flow path to generate backpressure of the coolant on the first side of the restrictor to maintain the coolant on the first side of the restrictor in the substantially liquid phase wherein a portion of the coolant on the second side of the restrictor vaporizes to provide a boiling heat transfer surface on the at least one riser.

In a further embodiment, the present invention includes a method of removing heat from a Fischer-Tropsch (F-T) slurry reactor. The method includes introducing a coolant into at least one downcomer at a pressure whereby the coolant is in a substantially liquid phase, the at least one downcomer having an upper portion, a lower portion, and a diameter disposed within the F-T reactor to deliver the coolant downward through the F-T reactor at a predetermined velocity, the at least one downcomer extending a length within the F-T reactor, the diameter of the at least one downcomer and the pressure of the introduced coolant cooperate to increase the coolant velocity thereby generating backpressure in the at least one downcomer to maintain the coolant in the substantially liquid phase along the length of the at least one downcomer. After introducing the coolant into at least one downcomer at a pressure whereby the coolant is in a substantially liquid phase, the coolant is forced into a plenum connected to the lower portion of the at least one downcomer; the plenum in fluid communication with the at least one downcomer wherein the coolant remains in the substantially liquid phase. Then, the coolant is forced into at least one riser having a length and extending upward from the plenum; the at least one riser in fluid communication with the plenum wherein a portion of the coolant vaporizes along the length of the at least one riser to provide a boiling heat transfer surface on the at least one riser.

In another embodiment, a method of removing heat from a Fischer-Tropsch (F-T) slurry reactor. The method includes introducing a coolant in a substantially liquid phase into at least one downcomer having an upper portion and a lower portion, the at least one downcomer disposed within the F-T reactor to deliver the coolant downward through the F-T reactor, the at least one downcomer extending a length within the F-T reactor wherein the coolant remains in the substantially liquid phase along the length of the at least one downcomer. Following the introduction of the coolant in the substantially liquid phase into at least one downcomer, the coolant is forced into a plenum connected to the lower portion of the at least one downcomer; the plenum in fluid communication with the at least one downcomer wherein the coolant remains in the substantially liquid phase. Then, the coolant is forced into at least one riser having a length and extending upward from the plenum; the at least one riser in fluid communication with the plenum wherein a portion of the coolant vaporizes along the length of the at least one riser, the at least one downcomer, the plenum, the at least one riser cooperating to define a flow path by which the coolant travels through the F-T reactor, the flow path having a restrictor positioned in a predetermined portion of the flow path, the restrictor having a first side and a second side to maintain the coolant on the first side of the restrictor in the substantially liquid phase wherein a portion of the coolant on the second side of the restrictor vaporizes to provide a boiling heat transfer surface on the at least one riser.

BRIEF DESCRIPTION OF THE DRAWINGS

FIG. 1 shows an elevational view of a coolant system for a Fischer-Tropsch reactor.

FIG. 2 shows a cross sectional view of FIG. 1 taken along line 2-2.

DETAILED DESCRIPTION OF THE INVENTION

Figure 3:
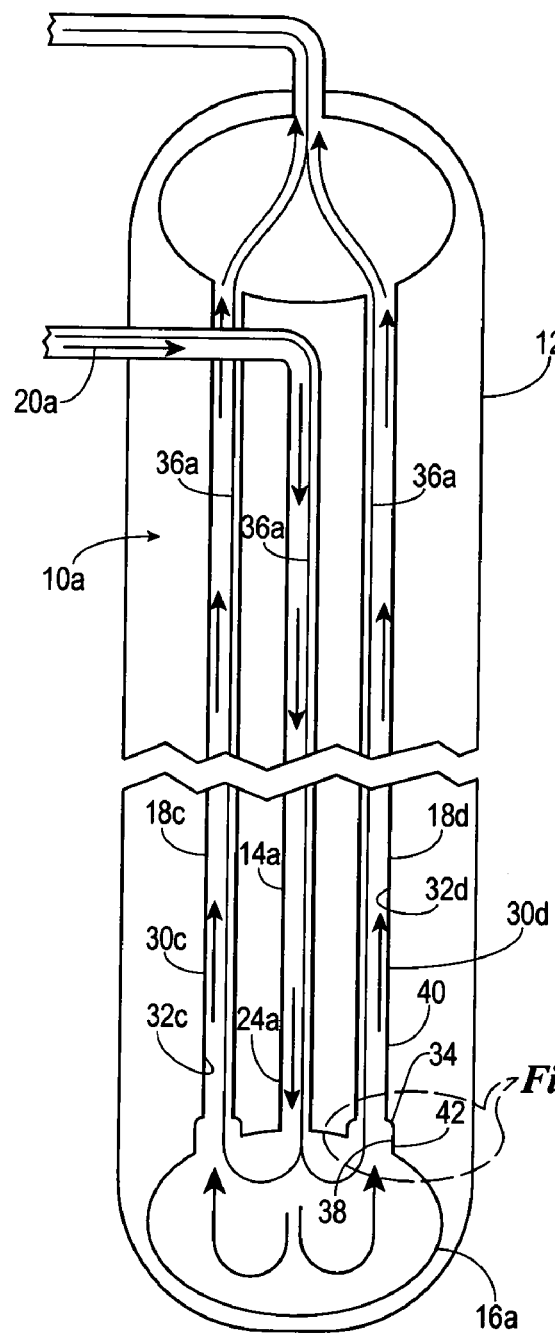
FIG. 3 shows an alternative embodiment of the coolant system for the Fischer-Tropsch reactor.

The present invention relates to a process and system for removing heat from a Fischer-Tropsch (F-T) slurry reactor by imposing a pressure drop to optimize log mean temperature difference. The main principle of the present invention is the utilization of a directed pressure drop to promote higher log-mean temperature difference (LMTD) in the cooling coil. The directed pressure drop can be brought about through various restrictions of flow in either the downcomer, the risers, or some combination thereof. In the present invention, riser surface area is available at a ratio of 1.5 to 20 times the surface area of the downcomer, thus promoting a higher LMTD between the cooling media and the reactive slurry matrix in the portion of the heat transfer device that is most prevalent. The improved driving force is made possible by the fundamental thermodynamic property of steam which is the temperature of saturated steam is directly correlated to its pressure. So, by manipulating where in the heat transfer device a lower pressure can be caused, the present invention increases the net heat transfer per unit area of the heat transfer device (abbreviated as "flux") through the heat transfer coil thenceforth and, as a result, provides an optimum flux in the overall heat transfer bundle.

Referring now to the drawings, and more particularly to FIGS. 1 and 2, shown therein is a coolant system 10 for a F-T reactor 12 constructed in accordance with the present invention. The coolant system 10 includes a downcomer 14, a plenum 16, risers 18a and 18b, and a coolant 20. For purposes of clarity, and not by way of limitation, only one downcomer 14 and two risers 18a and 18b are shown in FIG. 1. However, it should be understood and appreciated that there can be multiple downcomers 14 included in the coolant system 10 of the F-T reactor 12 and there can be more than two risers 18a and 18b for each downcomer 14 included in the coolant system 10 of the F-T reactor 12.

The downcomer 14 includes an entrance region 21, an upper portion 22 and a lower portion 24 and is disposed within the F-T reactor to deliver the coolant 20 downward through the F-T reactor at a predetermined velocity. The coolant 20 is introduced into the entrance region 21 of the downcomer 14 at a pressure sufficient to provide the coolant 20 in a substantially liquid phase.

In one embodiment of the present invention, the pressure drop to optimize log mean temperature difference can be generated by the diameter of the downcomer 14 and the pressure of the introduced coolant 20 cooperating to increase the coolant 20 velocity to the predetermined velocity. The downcomer 14 can be any combination of diameter size and length so that the coolant 20 remains in the substantially liquid phase throughout the downcomer 14. In this embodiment, the designer must take care to not exceed velocities which promote Flow Accelerated Corrosion (FAC). In the current embodiment of the invention, it is recommended not to use carbon steel as the material of construction for the downcomer unless one has confirmed that the FAC rates are within acceptable guidelines. It is recommended to utilize the methods presented in the Piping Handbook, 6th ed., Mohinder Nayyar, Ch C1 Water Systems Piping for confirming the downcomer velocity regime. The recommended procedure for designing a downcomer is to size the downcomer for a calculated carbon steel life between 22 and 30 years and limiting Rho-$V^2$ to a range of approximately 16,000 to about 17,000 wherein Rho is fluid density (pounds per cubic feet) at temperature and pressure and V representing the velocity (feet per second) of the fluid.

In one embodiment of the present invention, the diameter of the downcomer 14 is in a range of from about 2 inches inside diameter (I.D.) to about 8 inch ID and the length of the downcomer 14 is in a range of from about 60 ft to about 160 ft. The predetermined velocity of the coolant 20 in the downcomer 14 can be in a range of from about 8 ft/s to about 30 ft/s. The increase in coolant 20 velocity generates backpressure in the downcomer 14, which maintains the coolant 20 in the substantially liquid phase along the length of the downcomer 14. In one embodiment of the present invention, the velocity of the coolant 20 is increased by providing a reducer 23 in the entrance region 21 of the downcomer 14 to increase the velocity of the coolant 20 entering the downcomer 14. Such reducer 23 would also mark the transition point from carbon steel to low alloy steel due to the increased velocity of the coolant 20.

The coolant 20 introduced into the downcomer 14 can be pressurized by any means known in the art for pressurizing fluid, such as a pump. The pressure of the coolant 20 introduced into the downcomer 14 can be any pressure sufficient to maintain the coolant 20 in the substantially liquid phase throughout the downcomer 14. In one embodiment, the pressure of the coolant 20 introduced into the downcomer 14 is in a range of from about 80 psig to about 300 psig. It should be understood and appreciated that the coolant 20 can be any boiling fluid known in the art suitable for cooling an F-T reactor and handling the operating conditions of the coolant system 10, such as boiler feed water (BFW).

In one embodiment of the present invention, the downcomer 14 is constructed of a material capable of withstanding flow accelerated corrosion (FAC) from the increased coolant 20 velocity through the downcomer 14. The material of the downcomer 14 can be any material suitable for withstanding the operating conditions. Examples of materials include, but are not limited to, any steel alloys containing chromium, molybdenum, or combinations thereof. A specific example includes 2¼ Cr-1 Mo.

The plenum 16 is connected to the lower portion 24 of the downcomer 14 whereby the plenum 16 is in fluid communication with the downcomer 14 and directs the coolant 20 into the risers 18a and 18b. Due to the backpressure generated by the increased velocity of the coolant 20, the coolant 20 remains in the substantially liquid phase through the entire length of the downcomer 14 so that nominal vaporization takes place in the downcomer 14. Vaporization in the downcomer 14 can cause damage to the coolant system 10. Generating the backpressure in the downcomer 14 also retards vaporization in upstream equipment used to process the coolant 20.

The risers 18a and 18b include upper portions 28a and 28b and lower portions 30a and 30b. The risers 18a and 18b are connected to and extend upward from the plenum 16. The risers 18a and 18b are in fluid communication with the plenum 16 and direct the coolant 20 upward through the F-T reactor 12 and out of the F-T reactor 12 at an outlet 26. The pressure of the coolant 20 is letdown in the risers 18a and 18b causing a portion of the coolant 20 to vaporize in the risers 18a and 18b which provides boiling heat transfer surfaces 32a and 32b in the risers 18a and 18b, respectively, and promotes a higher temperature driving force in the risers 18a and 18b. The vaporization of the coolant 20 in the risers 18a and 18b provides for boiling heat transfer to occur in the risers 18a and 18b, which has a higher heat transfer film coefficient than sensible heat transfer to a liquid. Therefore, the riser's 18a and 18b heat transfer area is maximized by reducing the pressure of the coolant 20 in the risers 18a and 18b thus providing a larger temperature driving force. The larger temperature driving force facilitates higher heat removal per equivalent surface area. The cooling system 10 of the present invention results in less surface area required to remove the necessary heat from the F-T reactor, thus reducing the associated capital cost necessary to provide a boiling heat transfer surface on the risers 18a and 18b.

Figure 4:
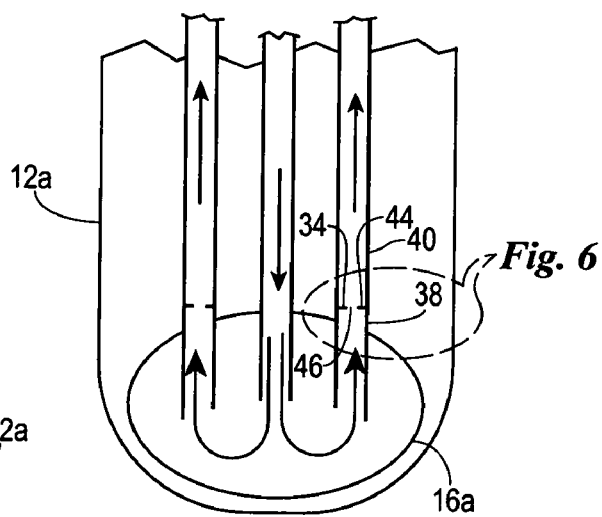
FIG. 4 shows a further embodiment of the coolant system for the Fischer-Tropsch reactor.

Referring now to FIGS. 3 and 4, shown therein is a further embodiment of the present invention where the pressure drop to optimize log mean temperature difference can be generated by the addition of a restrictor 34 to a coolant system 10a. A downcomer 14a, a plenum 16a, and each riser 18c and 18d cooperate to form a flow path 36 for a coolant 20a to pass through the coolant system 10a. The restrictor 34 is provided with a first side (upstream side) 38 and a second side (downstream side) 40. The restrictor 34 is positioned in a predetermined portion of a flow path 36a of the coolant 20a to generate backpressure of the coolant 20a on the first side 38 of the restrictor 34. Similar to the increasing the velocity of the coolant 20 to generate backpressure, the restrictor 34 generates backpressure on the first side 38, thus maintaining the coolant 20a in the substantially liquid phase on the first side 38 of the restrictor 34. The coolant 20a on the second side 40 of the restrictor 34 behaves similarly to the coolant 20a in the risers 18c and 18d when the backpressure is generated by increasing the velocity of the coolant 20a entering the downcomer 14a.

Therefore, the pressure of the coolant 20a is letdown on the second side 40 of the restrictor 34 causing a portion of the coolant 20a to vaporize on the second side 40 of the restrictor 34 which provides the boiling heat transfer surfaces 32c and 32d on the second side 40 of the restrictor 34, respectively, and promotes a higher temperature driving force on the second side 40 of the restrictor 34. The vaporization of the coolant 20a on the second side 40 of the restrictor 34 provides for boiling heat transfer to occur on the second side 40 of the restrictor 34, which has a higher heat transfer film coefficient than sensible heat transfer to a liquid. Therefore, the second side 40 of the restrictor's 34 heat transfer area is maximized by reducing the pressure of the coolant 20a on the second side 40 of the restrictor 34 thus providing a larger temperature driving force. The larger temperature driving force facilitates higher heat removal per equivalent surface area. The cooling system 10a of the present invention results in less surface area required to remove the necessary heat from the F-T reactor, thus reducing the associated capital cost.

Figure 5:
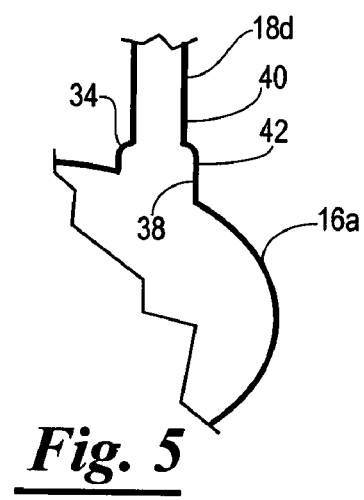
FIG. 5 shows a close-up view of a portion of the coolant system shown in FIG. 3.

The restrictor 34 can be any device capable of being positioned in the flow path 36a of the coolant 20a and generating backpressure of the coolant 20a on the first side 38 of the restrictor 34 and pressure letdown on the second side 40 of the restrictor 34. Referring now to FIG. 5, shown therein is an embodiment of the restrictor 34 of the present invention. The restrictor 34 shown in FIG. 5 is a reducer 42. It should be understood and appreciated that the reducer 42 can be any size and shape so that the operational parameters described herein for the coolant system 10a can be achieved.

Figure 6:
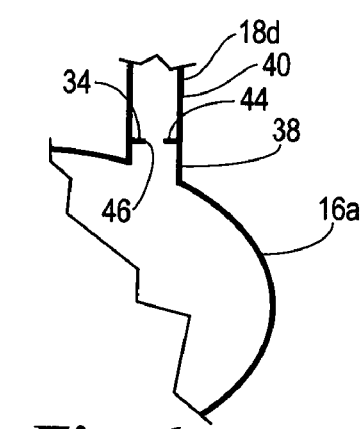
FIG. 6 shows a close-up view of a portion of the coolant system shown in FIG. 4.
Figure 7:
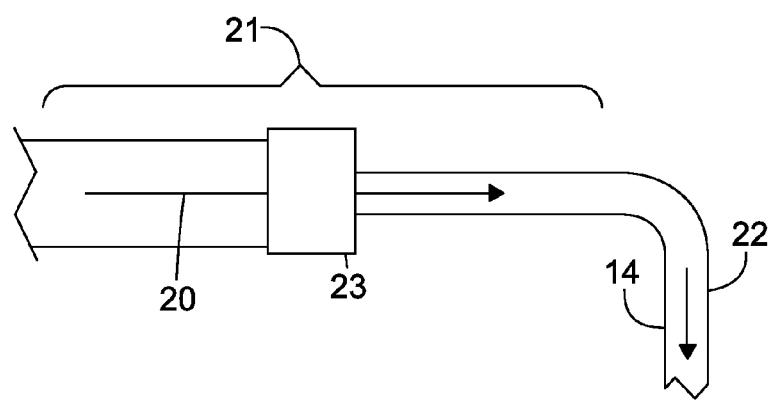
FIG. 7 is a close-up view of a portion of the coolant system constructed in accordance with the present invention.

Referring now to FIG. 6, shown therein is another embodiment of the restrictor 34 of the present invention. The restrictor 34 shown in FIG. 6 is an orifice plate 44. The orifice plate 44 has an opening 46. The opening 46 of the orifice plate 44 can be any size such that the operation parameters described herein for the coolant system 10a can be achieved. The size of the opening 46 corresponds to a specific beta ratio (β ratio with the following definition: β Ratio=orifice bore size/pipe inside diameter). The β ratio can be in a range of from about 0.25 to about 0.50.

The restrictor 34 can be disposed anywhere in the coolant system 10a along the flow path 36a of the coolant 20a so that backpressure is generated on the first side 38 of the restrictor 34 and pressure is letdown on the second side 40 of the restrictor 34 promoting a higher temperature driving force on the second side 40 of the restrictor 34. In one embodiment of the present invention, the restrictor 34 is positioned upstream of the plenum 16a. In another embodiment of the present invention, the restrictor 34 is positioned downstream of the plenum 16a. In another embodiment, the restrictor 34 is positioned in a lower portion 24a of the downcomer 14a. In a further embodiment of the present invention, the restrictor 34 is positioned in the lower portions 30c and 30d of the risers 18c and 18d, respectively. It should be understood and appreciated that if the restrictor 34 is positioned downstream of the plenum 16 there are the same number of restrictors 34 as there are risers for that given embodiment.

In use, the coolant 20 is introduced into the upper portion 22 of the downcomer 14 at a pressure such that the coolant 20 is in the substantially liquid phase. The downcomer 14 delivers the coolant 20 downward through the F-T reactor 12 wherein the coolant 20 is maintained in the substantially liquid phase along the length of the downcomer 14 due to the velocity of the coolant 20 and the diameter of the downcomer 14. After passing the length of the downcomer 14, the coolant 20 is forced into the plenum 16, which is connected to the lower portion 24 of the downcomer 14. The coolant 20 remains in the substantially liquid phase in the plenum 16 where the coolant 20 is forced into the risers 18a and 18b. In the risers 18a and 18b a portion of the coolant 20 vaporizes along the length of the risers 18a and 18b to provide the boiling heat transfer surfaces 32a and 32b in the risers 18a and 18b, respectively.

In another embodiment of the present invention, the coolant 20a is introduced into the upper portion 22 of the downcomer 14 at a pressure such that the coolant 20a is in the substantially liquid phase. The downcomer 14a delivers the coolant 20a downward through the F-T reactor 12a wherein the coolant 20a is maintained in the substantially liquid phase along the length of the downcomer 14a. From the downcomer 14a, the coolant 20a is forced into the plenum 16a where it is then forced into the risers 18c and 18d. The coolant 20a is also forced through the restrictor 34 positioned in the flow path 36 of the coolant 20a. Forcing the coolant 20a through the restrictor 34 generates backpressure on the first side 38 of the restrictor 34 and permits vaporization of the coolant 20a on the second side 40 of the restrictor 34. The vaporization of the coolant 20a on the second side 40 of the restrictor 34 provides the boiling heat transfer surfaces 32c and 32d on the risers 18c and 18d, respectively.

EXAMPLE 1

In order to demonstrate the impact of the invention, three cases are presented in Table 1. The design cooling duty was fixed as well as the reactor conversion parameters (that is, the hydrodynamic regime was modeled the same for each case). On the coolant side, circulation rate was held the same as were the inlet and outlet pressures on the cooling coil.

TABLE 1

|  |  | Downcomer ID | | |
| --- | --- | --- | --- | --- |
|  |  | 4 inch | 6 inch | 8 inch |
| U | Btu/hr/ft$^2$/° F. | 150.8 | 149.1 | 147.3 |
| LMTD | ° F. | 59.0 | 56.7 | 56.6 |
| Shell Weight | tonnes | 1,280.7 | 1,290.8 | 1,297.6 |
| Internals | tonnes | 463.2 | 494.9 | 530.3 |
| Skirt and miscellaneous supports | tonnes | 341.7 | 341.7 | 341.7 |
| Total Weight | tonnes | 2,085.7 | 2,127.5 | 2,169.6 |
| Increase | % | Base | 102% | 104% |
| Fabricated Cost (from quotation) | $/tonne | $11,571 | $ 11,571 | $ 11,571 |
| Cost Difference | $ | Base | $483,722 | $971,391 |

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A cooling system for removing heat from a Fischer-Tropsch (F-T) slurry reactor, the cooling system comprising:
   a coolant;
   only one downcomer having an upper portion, a lower portion, and a diameter; the downcomer capable of being disposed within the F-T reactor to deliver the coolant downward through the F-T reactor at a predetermined velocity, the downcomer extending a length within the F-T reactor wherein the coolant is introduced into the upper portion of the downcomer in a substantially liquid phase; the diameter of the downcomer and the pressure of the coolant cooperate to increase the coolant velocity thereby generating backpressure in the downcomer to maintain the coolant in the substantially liquid phase along the length of the downcomer; wherein the diameter of the downcomer is in a range of 2 inches I.D. to 8 inches I.D.;
   a plenum connected to the lower portion of the downcomer; the plenum in fluid communication with the downcomer wherein the coolant remains in the substantially liquid phase; and
   a plurality of riser each having a length and extending upward from the plenum; the plurality of risers in fluid communication with the plenum wherein a portion of the coolant vaporizes to provide a boiling heat transfer surface on the plurality of riser.

2. The cooling system of claim 1 wherein the pressure of the coolant introduced into the downcomer is at a pressure in a range of 80 psig to about 300 psig.

3. The cooling system of claim 1 wherein the downcomer is constructed of a material to retard flow accelerated corrosion, the material is selected from the group consisting of steel alloys containing chromium.

4. The cooling system of claim 1 wherein the coolant is boiler feed water (BFW).

5. The cooling system of claim 1 wherein a reducer is positioned in an entrance region of the downcomer to increase the velocity of the coolant introduced into the downcomer.

* * * * *